(12) United States Patent
Sugaya

(10) Patent No.: US 10,592,551 B2
(45) Date of Patent: Mar. 17, 2020

(54) CLOTHING INFORMATION PROVIDING SYSTEM, CLOTHING INFORMATION PROVIDING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/309,536

(22) PCT Filed: Jun. 16, 2016

(86) PCT No.: PCT/JP2016/067909
§ 371 (c)(1),
(2) Date: Dec. 13, 2018

(87) PCT Pub. No.: WO2017/216919
PCT Pub. Date: Dec. 21, 2017

(65) Prior Publication Data
US 2019/0317960 A1    Oct. 17, 2019

(51) Int. Cl.
*G06F 16/583*    (2019.01)
*G06T 7/55*    (2017.01)
*G06T 7/90*    (2017.01)
*G06F 16/587*    (2019.01)
*G06F 16/58*    (2019.01)

(52) U.S. Cl.
CPC ........ *G06F 16/5854* (2019.01); *G06F 16/587* (2019.01); *G06F 16/5838* (2019.01); *G06F 16/5866* (2019.01); *G06T 7/55* (2017.01); *G06T 7/90* (2017.01); *G06T 2207/30124* (2013.01)

(58) Field of Classification Search
CPC ............. G06F 16/5854; G06F 16/5838; G06F 16/587; G06F 16/5866; G06T 7/55; G06T 7/90; G06T 2207/30124
See application file for complete search history.

(56) References Cited

U.S. PATENT DOCUMENTS

| 2002/0103699 A1* | 8/2002 | Figueiras Ferreiro ....................... G06Q 30/02 705/14.5 |
| 2012/0155704 A1* | 6/2012 | Williams ................ G01W 1/00 382/103 |
| 2013/0266217 A1* | 10/2013 | Gershon .............. G06K 9/6212 382/164 |
| 2014/0330684 A1 | 11/2014 | Mizui et al. |
| 2015/0084984 A1* | 3/2015 | Tomii ..................... H04N 5/232 345/619 |

(Continued)

FOREIGN PATENT DOCUMENTS

| JP | 2003-345872 | 12/2003 |
| JP | 2008-203916 | 9/2008 |

(Continued)

*Primary Examiner* — Jesse P Frumkin
(74) *Attorney, Agent, or Firm* — Lex IP Meister, PLLC

(57) ABSTRACT

A clothing information providing system 1 includes an image acquiring unit 11 that acquires an image captured by an image capturing device 2 via a network 90, a detecting unit 121 that analyzes the image acquired by the image acquiring unit and detects clothing of a subject appearing in the image, and a display unit 24 that displays clothing information on the clothing detected by the detecting unit 121 on a user terminal 20.

18 Claims, 20 Drawing Sheets

(56) References Cited

U.S. PATENT DOCUMENTS

| | | | | |
|---|---|---|---|---|
| 2015/0117790 | A1* | 4/2015 | Kamiya | G06K 9/00221 |
| | | | | 382/203 |
| 2016/0148383 | A1* | 5/2016 | Cerqueira | G06F 16/50 |
| | | | | 382/194 |
| 2016/0178803 | A1* | 6/2016 | Haas | G01W 1/10 |
| | | | | 702/3 |
| 2016/0334545 | A1* | 11/2016 | Varelas | G01W 1/02 |
| 2016/0334546 | A1* | 11/2016 | Ma | G01W 1/00 |
| 2019/0130195 | A1* | 5/2019 | Sugaya | G01W 1/10 |

FOREIGN PATENT DOCUMENTS

| | | |
|---|---|---|
| JP | 2012-173761 | 9/2012 |
| JP | 2013-120473 | 6/2013 |
| JP | 2016-021716 | 2/2016 |

\* cited by examiner

FIG. 6

| Camera identifier | Position information | Attribute information | | | |
|---|---|---|---|---|---|
| | | Model | Manager | Indoor/outdoor | Height |
| 000001 | N35.52480 E135.01582 | M1 | Company A | Outdoor | 10m from ground |
| 000002 | N35.52481 E135.01582 | M1 | Company B | Outdoor | 3m from ground |
| 000003 | N35.52481 E135.01582 | M5 | Company C | Indoor | B1F |
| 000004 | N35.52481 E135.01582 | M5 | Company C | Indoor | 1F |
| 000005 | N35.52481 E135.01582 | M5 | Company C | Indoor | 2F |
| 000005 | N35.52481 E135.01582 | M5 | Company C | Indoor | 3F |
| ... | ... | ... | ... | ... | ... |

| Image identifier | Camera identifier | Position information | Original information | | | Subject information | | Time stamp |
|---|---|---|---|---|---|---|---|---|
| | | | Part | Shape | Color | Age | Gender | |
| 12345678 | 000004 | N35.52480 E135.01582 | Upper | Short sleeve | Red | 40-49 | Male | 2016/06/08 12:13:05 |
| 12345678 | 000004 | N35.52481 E135.01582 | Lower | Pants | Navy | | | |
| 12345678 | 000004 | N35.52481 E135.01582 | Upper | Long sleeve | White | 30-39 | Female | 2016/06/08 12:13:05 |
| 12345678 | 000004 | N35.52481 E135.01582 | Lower | Skirt | Navy | | | |
| 12345678 | 000004 | N35.52481 E135.01582 | Head | Hat | White | | | |
| 12345678 | 000004 | N35.52481 E135.01582 | Upper | Long sleeve | White | 30-39 | Male | 2016/06/08 12:13:05 |
| 12345678 | 000004 | N35.52481 E135.01582 | Lower | Pants | Gray | | | |
| ... | ... | ... | ... | ... | ... | ... | ... | ... |

FIG. 8

| Population | After processing ||| Time stamp |
| --- | --- | --- | --- | --- |
| | Wearing rate of short sleeves | Wearing rate of long sleeves | Wearing rate of coats | |
| City A | 55 | 42 | 3 | 2016/06/08 12:15:00 |
| City B | 57 | 42 | 1 | 2016/06/08 12:20:00 |
| City C | 60 | 39 | 1 | 2016/06/08 12:15:00 |
| City D | 62 | 38 | 0 | 2016/06/08 12:20:00 |
| City E | 58 | 41 | 1 | 2016/06/08 12:12:00 |
| ... | ... | ... | ... | ... |

| | | |
|---|---|---|
| | 58%<br>26℃ | 58<br>26℃ |
| | 57%<br>25℃ | 59%<br>27℃ |

Wearing rate of short sleeves / sensible temperature

906

CLOTHING INFORMATION PROVIDING SYSTEM, CLOTHING INFORMATION PROVIDING METHOD, AND PROGRAM

TECHNICAL FIELD

The present invention relates to a clothing information providing system, a clothing information providing method, and a program.

BACKGROUND ART

There is known a system for collecting various types of information from images is known. For example, Patent Document 1 describes a technique for extracting customer information from images of items (for example, shirts, pants, skirts, etc.) owned by a customer in order to acquire purchase information directly linked to marketing.

PRIOR ART DOCUMENT

Patent Document

Patent Document 1: Japanese Patent Application Publication No. 2008-203916

SUMMARY OF THE INVENTION

Technical Problem

In the technique described in Patent Document 1, a user of a terminal cannot acquire information about clothing actually worn by other people. On the other hand, the present invention provides a technique for providing information about clothing actually worn by other people to a user terminal.

Technical Solution

The present invention provides a clothing information providing system including an image acquiring unit that acquires an image captured by an image capturing device via a network, a detecting unit that analyzes the image acquired by the image acquiring unit and detects clothing of a subject appearing in the image, and a display unit that displays clothing information about the clothing detected by the detecting unit on a user terminal.

Further, the present invention provides a clothing information providing method including acquiring an image captured by an image capturing device via a network, analyzing the acquired image and detecting clothing of a subject appearing in the image, providing clothing information about the detected clothing to a user terminal, and displaying the provided clothing information on a user terminal.

Furthermore, the present invention provides a program for causing one or more computers to execute acquiring an image captured by an image capturing device via a network, analyzing the acquired image and detecting clothing of a subject appearing in the image, providing clothing information about the detected clothing to a user terminal, and displaying the provided clothing information on a user terminal.

Effects of the Invention

According to the present invention, a user of a user terminal can know information about clothing of other people.

BRIEF DESCRIPTION OF THE DRAWINGS

FIG. 6 is a diagram exemplifying information recorded in a database 131.

FIG. 7 is a diagram exemplifying information recorded in a database 132.

FIG. 8 is a diagram exemplifying information recorded in a database 133.

FIG. 18 is a diagram exemplifying a screen for displaying clothing information and environmental information.

DESCRIPTION OF REFERENCE NUMBERS

1: clothing information providing system, 2: camera, 10: server, 11: image acquiring unit, 12: analyzing unit, 13: storage unit, 14: selecting unit, 15: providing unit, 20: user terminal, 21: accepting unit, 22: requesting unit, 23: receiving unit, 24: display unit, 25: storage unit, 26: selecting unit, 90: network, 101: CPU, 102: RAM, 103: ROM, 104: auxiliary storage device, 105: communication IF, 121: detecting unit, 122: statistical processing unit, 123: estimating unit, 131: database (camera), 132: database (original information), 133: database (post-processing information), 201: CPU, 202: RAM, 203: ROM, 204: auxiliary storage device, 205: communication IF, 206: input device, 207: display device, 901: text box, 902: button, 903: area, 904: area, 905: button, 906: area, 907: area, 908: slider, 909: slider

DETAILED DESCRIPTION OF THE EMBODIMENTS

1. Configuration

Figure 1:
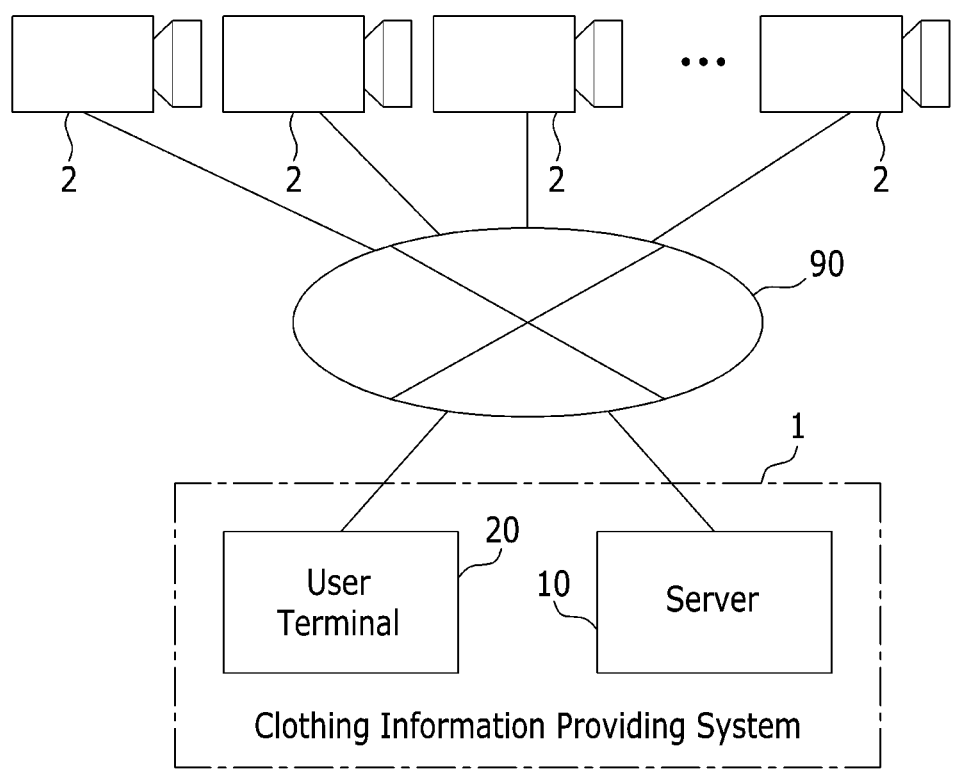
FIG. 1 is a diagram exemplifying an overview of a clothing information providing system 1 according to an embodiment.

FIG. 1 is a diagram exemplifying an overview of a clothing information providing system 1 according to an embodiment. A clothing information providing system 1 is a system which detects clothing from an image captured by a camera connected to a network and provides information about the detected clothing (hereinafter referred to as "clothing information") to a user terminal. The clothing information providing system 1 is connected to a plurality of cameras 2 via a network 90. The camera 2 is an image capturing device which captures an image, and is, for example, a security camera installed at a fixed point. The plurality of cameras 2 are installed indoors or outdoors around the world. The camera 2 continuously captures the vicinity of the camera 2 and outputs a captured image (a moving image in this example). The network 90 may be any network which connects the cameras 2, a server 10, and a user terminal 20, and may be, for example, the Internet, a LAN, a WAN, or a combination thereof.

The clothing information providing system 1 includes the server 10 and the user terminal 20. The server 10 analyzes images outputted from the plurality of cameras 2 and provides the analyzed results to the user terminal 20. The user terminal 20 is a device which functions as a client of the clothing information providing system, and accepts an instruction from the user and displays information to the user.

Figure 2:
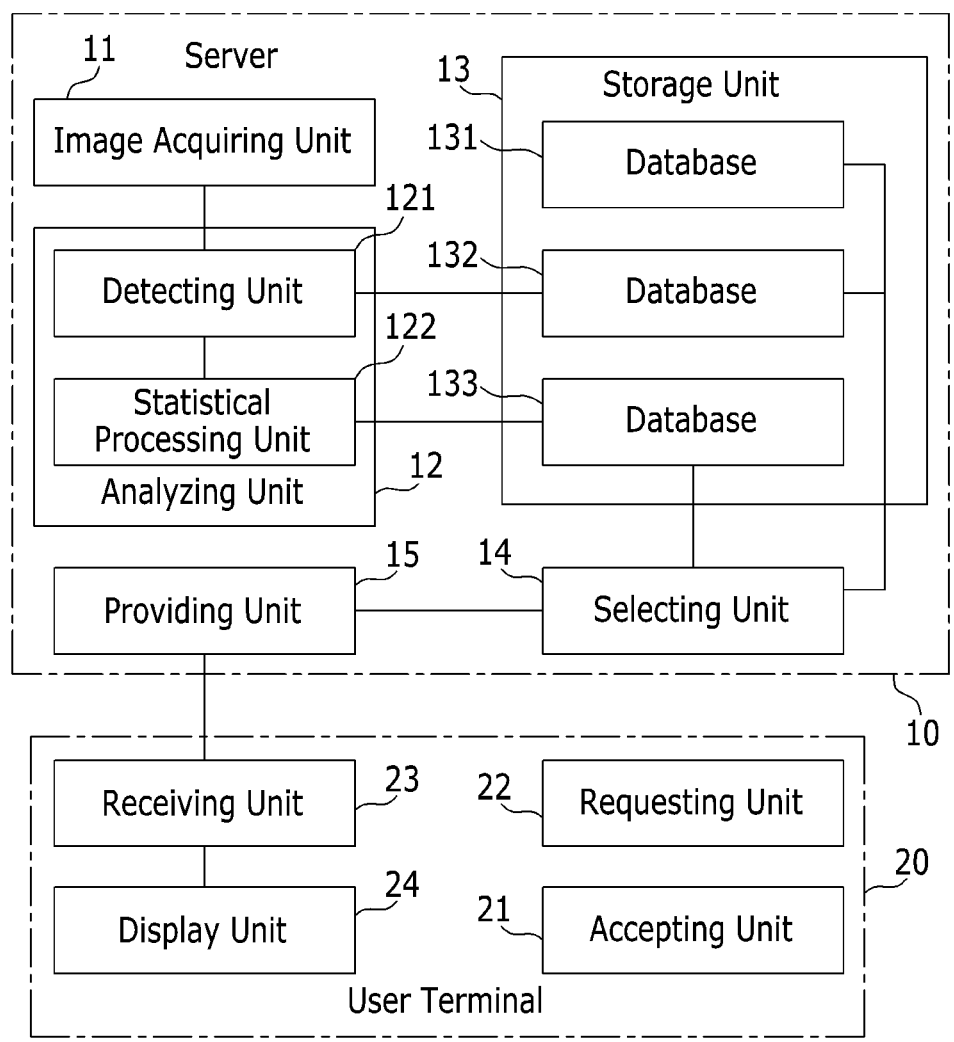
FIG. 2 is a diagram exemplifying a functional configuration of a clothing information providing system 1.

FIG. 2 is a diagram exemplifying a functional configuration of a clothing information providing system 1. The clothing information providing system 1 includes an image acquiring unit 11, an analyzing unit 12, a storage unit 13, a selecting unit 14, a providing unit 15, an accepting unit 21, a requesting unit 22, a receiving unit 23, and a display unit 24. In this example, in the clothing information providing system 1, the image acquiring unit 11, the analyzing unit 12, the storage unit 13, the selecting unit 14, and the providing unit 15 are implemented in the server 10, and the receiving unit 21, the requesting unit 22, the receiving unit 23, and the display unit 24 are implemented in the user terminal 20.

The image acquiring unit 11 acquires an image captured by the camera 2 via the network 90. The analyzing unit 12 analyzes the image acquired by the image acquiring unit 11. In this example, the analyzing unit 12 includes a detecting unit 121 and a statistical processing unit 122. The detecting unit 121 analyzes the image acquired by the image acquiring unit 11 and detects clothing of a subject appearing in the image. The statistical processing unit 122 statistically processes the clothing detected by the detecting unit 121. The storage unit 13 stores various types of information. In this example, the storage unit 13 is an example of a first storage unit that stores a database 131, a database 132, and a database 133. The database 131 is a database in which information about the camera 2 that which the image to the clothing information providing system 1 is recorded. The database 132 is a database in which information about the clothing detected by the detecting unit 121 is recorded. The database 133 is a database in which a result of statistical processing of the information about clothing is recorded.

The accepting unit 21 accepts an instruction for browsing clothing information from a user. In response to the instruction accepted by the accepting unit 21, the requesting unit 22 transmits a request for clothing information provision to the server 10. The selecting unit 14 is an example of a first selecting unit that selects the clothing information corresponding to the request transmitted from the user terminal 20 among the clothing information recorded in the database. The providing unit 15 provides the clothing information selected by the selecting unit 14 to the user terminal 20. The receiving unit 23 receives the clothing information provided by the providing unit 15. The display unit 24 displays the clothing information received by the receiving unit 23.

Figure 3:
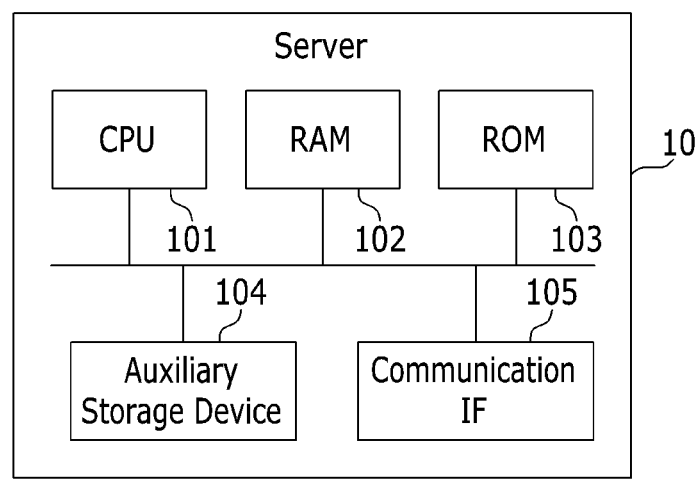
FIG. 3 is a diagram exemplifying a hardware configuration of a server 10.

FIG. 3 is a diagram exemplifying a hardware configuration of a server 10. The server 10 is a computer device including a CPU (Central Processing Unit) 101, a RAM (Random Access Memory) 102, a ROM (Read Only Memory) 103, an auxiliary storage device 104, and a communication IF 105. The CPU 101 is a processor which performs various operations. The RAM 102 is a volatile storage device which functions as a work area when the CPU 101 executes a program. The ROM 103 is, for example, a nonvolatile storage device which stores a program and data used for starting the server 10. The auxiliary storage device 104 is a nonvolatile storage device which stores various programs and data, and includes, for example, an HDD (Hard Disk Drive) and an SSD (Solid State Drive). The communication IF 105 is an interface which performs communication via the network 90 in accordance with a predetermined communication standard.

In this example, the auxiliary storage device 104 stores a program (hereinafter referred to as a "server program") for making the computer device function as a server in the clothing information providing system 1. The CPU 101 executes the server program thereby implementing the functions shown in FIG. 2. The CPU 101 executing the server program is an example of the image acquiring unit 11, the analyzing unit 12, the selecting unit 14, and the providing unit 15. The auxiliary storage device 104 is an example of the storage unit 13.

Figure 4:
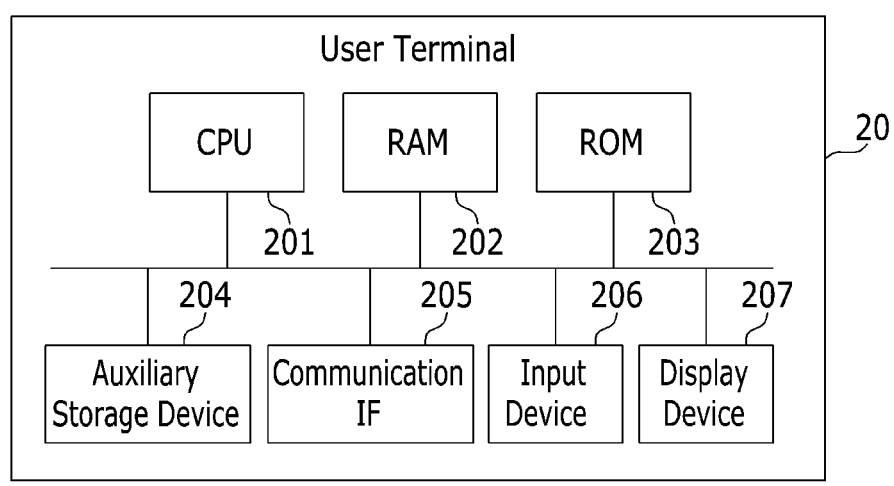
FIG. 4 is a diagram exemplifying a hardware configuration of a user terminal 20.

FIG. 4 is a diagram exemplifying a hardware configuration of a user terminal 20. The user terminal 20 is a computer device including a CPU 201, a RAM 202, a ROM 203, an auxiliary storage device 204, a communication IF 205, an input device 206, and a display device 207. More specifically, the user terminal 20 is, for example, a smart phone or a tablet terminal. The CPU 201 is a processor which performs various operations. The RAM 202 is a volatile storage device which functions as a work area when the CPU 201 executes a program. The ROM 203 is, for example, a nonvolatile storage device which stores a program and data used for starting the user terminal 20. The auxiliary storage device 204 is a nonvolatile storage device which stores various programs and data, and includes at least one of, for example, an HDD and an SSD. The communication IF 205 is an interface which performs communication via the network 90 in accordance with a predetermined communication standard. The communication standard may be a wireless communication standard or a wired communication standard. The input device 206 is a device for a user to input an instruction and information to the CPU 201, and includes, for example, at least one of a touch sensor, a keypad, and a microphone. The display device 207 is a device which displays information, and includes, for example, an LCD (Liquid Crystal Display).

In this example, the auxiliary storage device 204 stores a program (hereinafter referred to as a "client program") for making the computer device function as a client in the clothing information providing system 1. The CPU 201 executes the client program thereby implementing the functions shown in FIG. 2. The CPU 201 executing the client program is an example of the accepting unit 21 and the requesting unit 22. The communication IF 205 is an example of the receiving unit 23. The display device 207 is an example of the display device 24.

2. Operation

2.1. Image Collection, Analysis, and Accumulation

Figure 5:
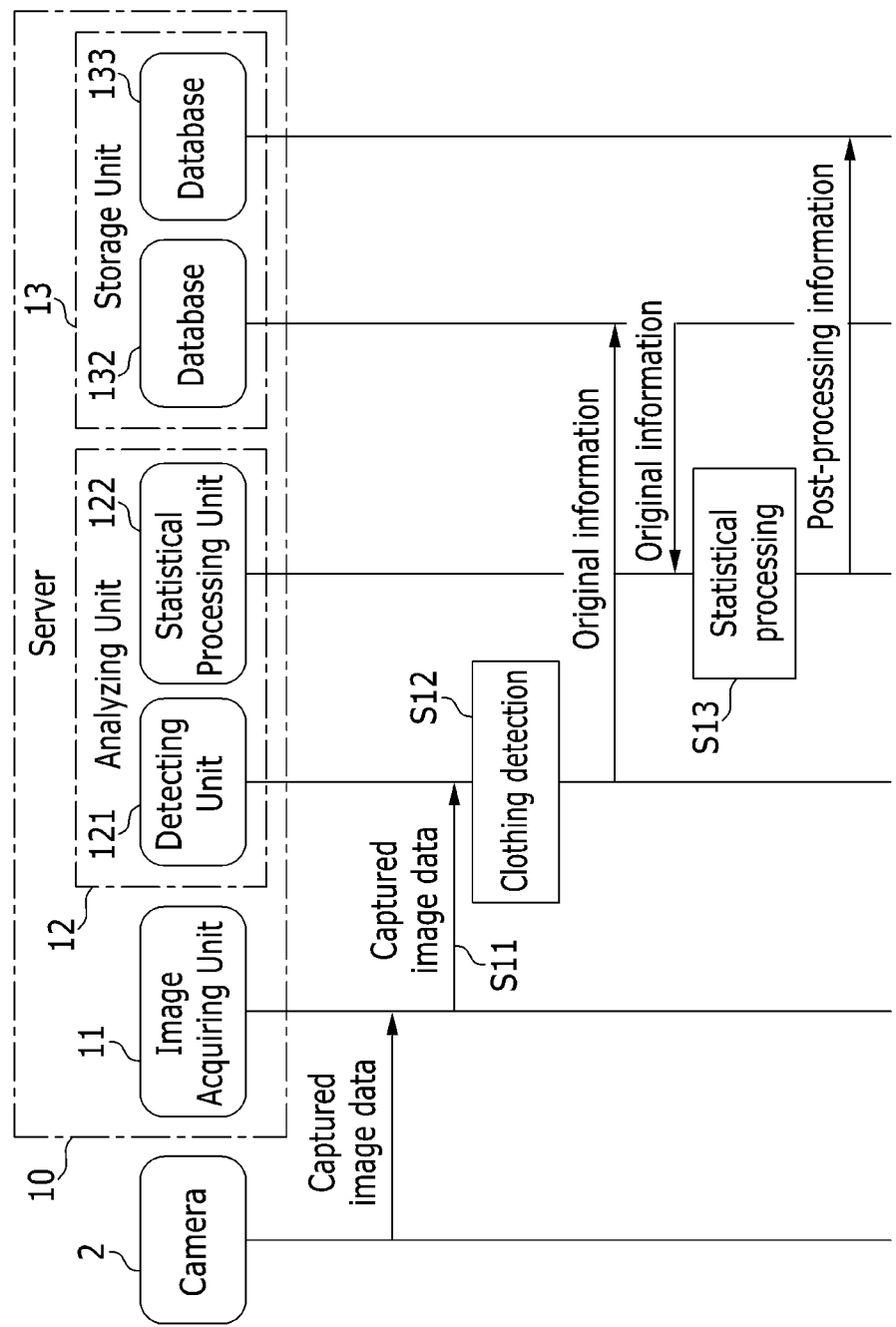
FIG. 5 is a sequence chart exemplifying an operation related to image collection, analysis, and accumulation.

FIG. 5 is a sequence chart exemplifying an operation of a clothing information providing system 1 according to an embodiment, in particular, an operation related to image collection, analysis, and accumulation. Here, in order to simplify the drawing, only one of the plurality of cameras 2 which transmit images to the clothing information providing system 1 is shown. The camera 2 continuously transmits (outputs) a captured image (a moving image) to a server 10 in real time.

In step S11, an image acquiring unit 11 acquires an image (hereinafter referred to as a "captured image", and data of the captured image are referred to as "captured image data") captured by the camera 2. The captured image data include, in addition to data indicating the captured image, attribute information about the camera 2 which has captured this image, for example, an identifier of the camera. Here, acquiring the captured image means acquiring the captured image data via a network 90 and storing the acquired captured image data at least temporarily in a storage unit 13. In this example, since the camera 2 continuously outputs the captured images, the image acquiring unit 11 continuously acquires the captured images.

FIG. 6 is a diagram exemplifying information recorded in a database 131. In the database 131, a camera identifier, position information, and attribute information are recorded. The identifier is information for identifying the camera 2. The position information is information indicating a geographical position where the camera 2 is installed. In this example, the position information is information indicating latitude and longitude. The attribute information includes information about an attribute of the camera 2, for example, information about a model name, a manager name, and an installation location. The information about installation location is, for example, information which specifies whether the installation location is outdoor or indoor, a height of the camera (the height from the ground) in the outdoor location, an installed floor in the indoor location, and the like.

Referring to FIG. 5 again, the analyzing unit 12 analyzes the captured image data and obtains clothing information. Here, the clothing information is a concept including information directly obtained from the individual captured image (hereinafter referred to as "original information") and information obtained by processing the original information obtained from a plurality of captured images (hereinafter referred to as "post-processing information"). Specifically, a detecting unit 121 first detects clothing of a subject appearing in the captured image (step S12). Detection of clothing is started with a predetermined event as a trigger. The event for triggering the clothing detection is, for example, an event that a predetermined time has elapsed since a previous detection. Known methods are used for the clothing detection. A specific example is as follows. First, the detecting unit 121 identifies a frame to be subjected to the clothing detection, among a moving image represented by the captured image data. Hereinafter, when an operation of the analyzing unit 12 is described, the frame to be subjected to the clothing detection is simply referred to as a "captured image". Next, the detecting unit 121 performs face detection on the captured image. The face detection is a process of detecting an area (hereinafter referred to as a "face area") corresponding to a human face from the captured image. Next, the detecting unit 121 specifies a range of a person (hereinafter referred to as a "person range") based on a position and size of the face area obtained by the face detection. Here, the specified person range does not need to be a range in which the person is exactly extracted from the captured image, but may be a rough range corresponding to the person. The detecting unit 121 splits the person range into an area of the person (hereinafter referred to as a "person area") and an area of background (hereinafter referred to as a "background area"). The detecting unit 121 divides the person area into small areas. The detecting unit 121 extracts features (for example, colors) from the small areas. The detecting unit 121 integrates the small areas based on the extracted features and obtains an area for each clothing. The detecting unit 121 generates the original information from an area obtained as the result of integration. In this example, the original information includes information indicating a shape of the clothing (a short-sleeved shirt, a long-sleeved shirt, a jacket, a coat, pants, a skirt, a dress, a hat, or the like.) and information indicating a color of the clothing.

Further, the detecting unit 121 generates information (hereinafter referred to as "subject information") indicating an attribute of the subject from the captured image. The subject information includes, for example, information indicating the gender and age group of the subject. The detecting unit 121 determines the gender and age group of the subject from the face area in the captured image. The detecting unit 121 records the original information and subject information generated from the captured image in the database 132.

FIG. 7 is a diagram exemplifying information recorded in a database 132. In the database 132, an image identifier, a camera identifier, position information, original information, subject information, and a time stamp are recorded. The image identifier is an identifier of a captured image which the original information is extracted based on. The camera identifier is an identifier of a camera which has captured the captured image. The position information is information indicating a position at which the captured image from which the original information has been extracted in step S12 has been captured. The detecting unit 121 refers to the database 131 to obtain the position information from the camera identifier. The time stamp indicates a time when the corresponding original information is recorded in the database 132. In a case where a plurality of subjects are included in a single captured image, the detecting unit 121 generates the original information and the subject information for each of the plurality of subjects.

Referring to FIG. 5 again, in step S13, a statistical processing unit 122 performs statistical processing on the original information recorded in the database 132. The statistical processing is started with a predetermined event as a trigger. The event for triggering the statistical processing is, for example, an event that a predetermined time has passed since the previous statistical processing. The statistical processing is performed with a predetermined geographical unit (for example, by municipality or by prefecture) as a population. Items of the statistical processing are predetermined. The statistical processing unit 122 calculates a wearing rate of clothing with a specific shape, for example, a wearing rate of short sleeves, a wearing rate of long sleeves, and a wearing rate of coats. All of these are examples of post-processing information. The statistical processing unit 122 records the obtained post-processing information in the database 133.

FIG. 8 is a diagram exemplifying information recorded in a database 133. In the database 133, a wearing rate of short sleeves, a wearing rate of long sleeves, a wearing rate of coats, and a time stamp are recorded. The wearing rate of short sleeves indicates a proportion of subjects wearing the short sleeves in all subjects. Similarly, the wearing rate of long sleeves and the wearing rate of coats indicate a proportion of subjects wearing the long sleeves and a proportion of subjects wearing the coats in all subjects, respectively. The time stamp indicates a time when these pieces of post-processing information are recorded in the database 133. The post-processing information is associated with information for specifying the population of the statistical processing. In the example of FIG. 8, the post-processing information is obtained by using each city as the population, but the database 133 may further include a result of statistical processing in a different population (for example, prefecture unit). Since acquiring and analyzing the captured images are repeatedly and continuously performed, the database 132 and the database 133 are continuously updated to the latest information.

2.2. Acquisition and Display of Clothing Information

Figure 9:
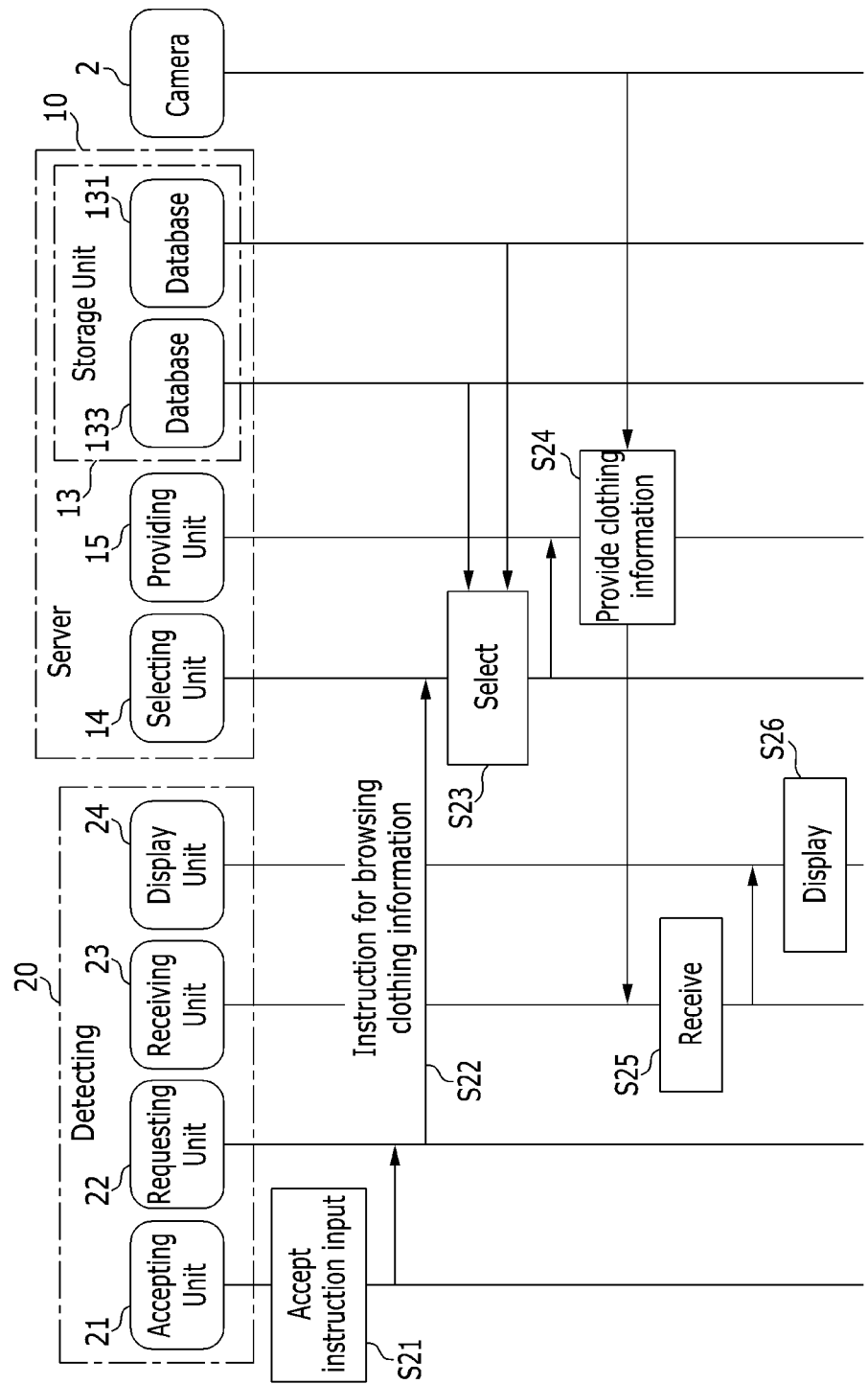
FIG. 9 is a sequence chart exemplifying an operation related to acquisition and display of clothing information.

FIG. 9 is a sequence chart exemplifying an operation of a clothing information providing system 1 according to an embodiment, in particular, an operation related to acquisition and display of clothing information in a user terminal 20.

In step S21, an accepting unit 21 receives an input of an instruction for browsing clothing information from a user. This instruction includes information serving as a key for narrowing down the clothing information (hereinafter referred to as "key information").

Figure 10:
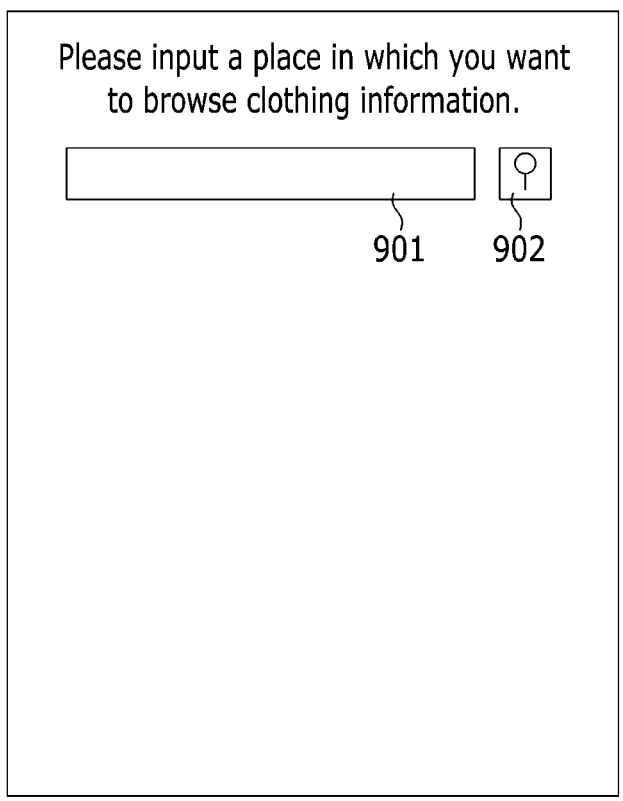
FIG. 10 is a drawing exemplifying a screen for inputting an instruction for browsing clothing information.

FIG. 10 is a diagram exemplifying a screen for inputting the instruction for browsing the clothing information. This screen includes a text box 901 and a button 902. The text box 901 is an area for inputting the key information. In this example, information designating a geographical position (hereinafter referred to as "geographical information") is inputted as the key information. The geographical information includes at least one of, for example, a name, landmark (building, station, tourist facility, or the like) and address of a municipality. An accepting unit 21 accepts a designation of the geographical position by the user. The button 902 is a button for inputting an instruction used to transmit the instruction for browsing the clothing information to a server 10.

Referring to FIG. 9 again, when the button 902 is pressed, a requesting unit 22 transmits a request for browsing the clothing information to the server 10 (step S22). This request includes the key information inputted in step S21.

Upon receiving the instruction for browsing the clothing information from the user terminal 20, a selecting unit 14 selects post-processing information corresponding to the key information included in the instruction from among the post-processing information recorded in the database 133 (step S23). For example, when a "city B" is designated as the key information in a case where data shown in FIG. 8 are recorded in a database 133, the selecting unit 14 selects, as the post-processing information corresponding to the city B, a wearing rate of short sleeves, a wearing rate of long sleeves, and a wearing rate of coats in the city B. Furthermore, the selecting unit 14 selects one camera 2 which most closely matches (e.g., is closest to) the geographical information included in the key information from among cameras 2 registered in the database 131.

In step S24, a providing unit 15 transmits the post-processing information selected by the selecting unit 14 to the user terminal 20 which is a source of the request. Furthermore, the providing unit 15 transmits an image captured by the selected camera to the user terminal 20.

In step S25, a receiving unit 23 receives the clothing information from the server 10. In step S26, a display unit 24 displays the clothing information received by the receiving unit 23. Here, the displayed clothing information is clothing information corresponding to the geographical position accepted by the accepting unit 21.

Figure 11:
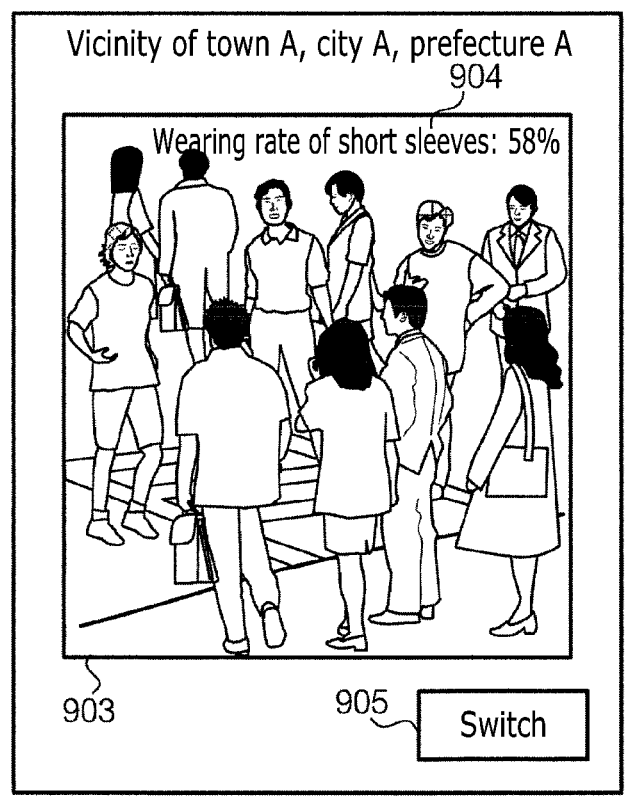
FIG. 11 is a diagram exemplifying a screen displayed by a display unit 24.

FIG. 11 is a diagram exemplifying a screen for displaying the clothing information. This screen includes an area 903, an area 904, and a button 905. The area 903 is an area for displaying the image provided from the server 10. This image is an image captured by the selected camera, and is, for example, a real-time moving image. The area 904 is an area overlapped with the area 903 and displays the clothing information (the post-processing information in this example). The moving image displayed in the area 903 is a moving image captured by the selected camera 2 and is updated at a predetermined frame rate (for example, 30 frames per second). While the clothing detection and statistical processing are also performed repeatedly, the clothing detection and statistical processing are not performed every frame in this example so that the clothing information is updated at a frequency lower than the frame rate (for example, once every 5 minutes). The button 905 is a button for switching the post-processing information displayed in the area 904. Each time the button 905 is pressed, the clothing information displayed in the area 904 is switched, for example, in the order of the wearing rate of short sleeves, the wearing rate of long sleeves, and the wearing rate of coats. It is set in the server 10 or the user terminal 20 which clothing information is first displayed after a client program is activated. For example, the clothing information which is first displayed may be determined according to an environment (current date and time, a current position, gender of the user, or the like) in which the user terminal 20 is used. For example, the wearing rate of short sleeves may be first displayed in summer, and the wearing rate of long sleeves may be first displayed in winter.

According to the present embodiment, the user of the user terminal 20 can easily obtain information about clothing of other people in a range which cannot be visually confirmed.

3. Modified Examples

The present invention is not limited to the above-described embodiments, and various modifications can be made. Several modified examples are described below.

Two or more of the following modified examples may be used in combination.

3.1. Modified Example 1

Key information for selecting information to be provided to a user terminal 20 is not limited to information which designates only one geographical position. The key information may designate a route including a departure place and a destination.

In this case, an accepting unit 21 accepts a designation of the route including the departure place and the destination. A selecting unit 14 selects information corresponding to the route from among post-processing information recorded in a database 133. The information corresponding to the route is, for example, post-processing information at a geographical position included in a map including the departure place and the destination on one screen. Specifically, when a route from a city A to a city B is designated, the selecting unit 14 specifies a geographical region included in the map which includes this route on one screen, and selects post-processing information corresponding to this geographical region.

Figure 12:
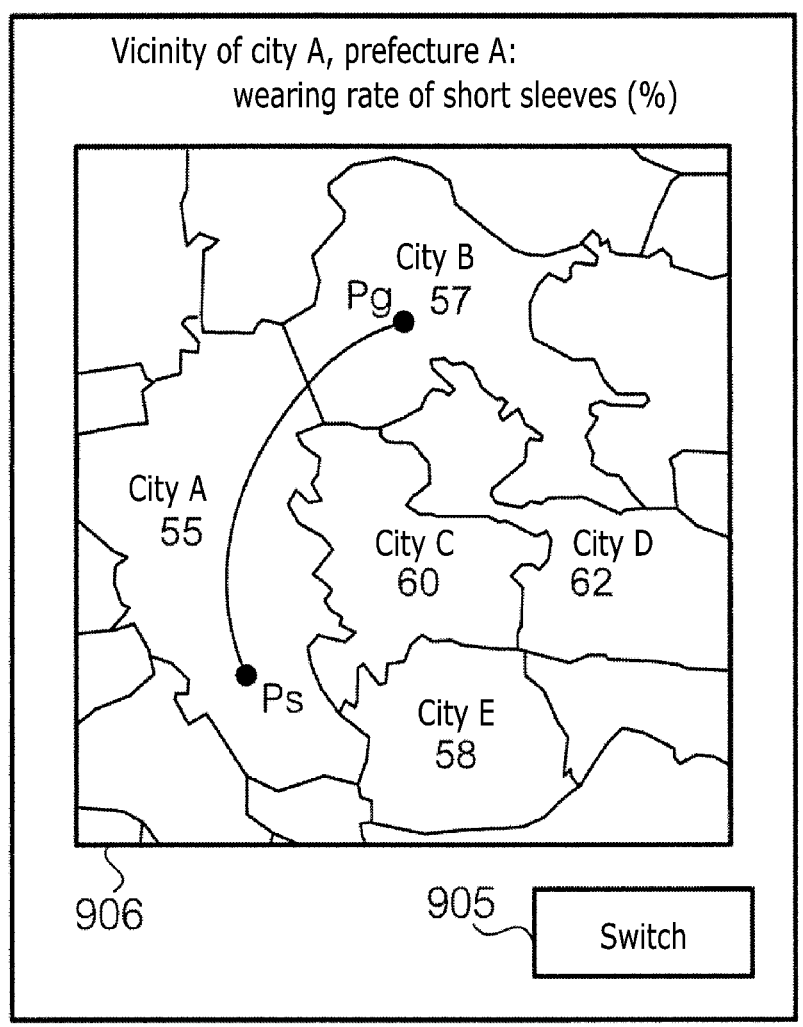
FIG. 12 is a diagram exemplifying a screen according to modified example 1 for displaying clothing information.

FIG. 12 is a diagram exemplifying a screen according to modified example 1 for displaying clothing information. This screen includes an area 906. The area 906 is an area for displaying a map. The map includes a departure place Ps and a destination Pg on one screen. Specifically, the map includes, in addition to the city A and the city B, a city C, a city D, and a city E around the cities A and B. Clothing information (a wearing rate of short sleeves in this example) in these geographical regions is displayed with being overlapped with each region. In other words, a display unit 24 displays the clothing information corresponding to the route accepted by the accepting unit 21. According to this example, the clothing information can be outputted in association with the map. For example, when preparing for an overseas trip, a user can know about what people are actually wearing on the route to the destination, while staying at home. As shown in this example, the screen displayed on the display unit 25 may not include the captured image.

3.2. Modified Example 2

Figure 13:
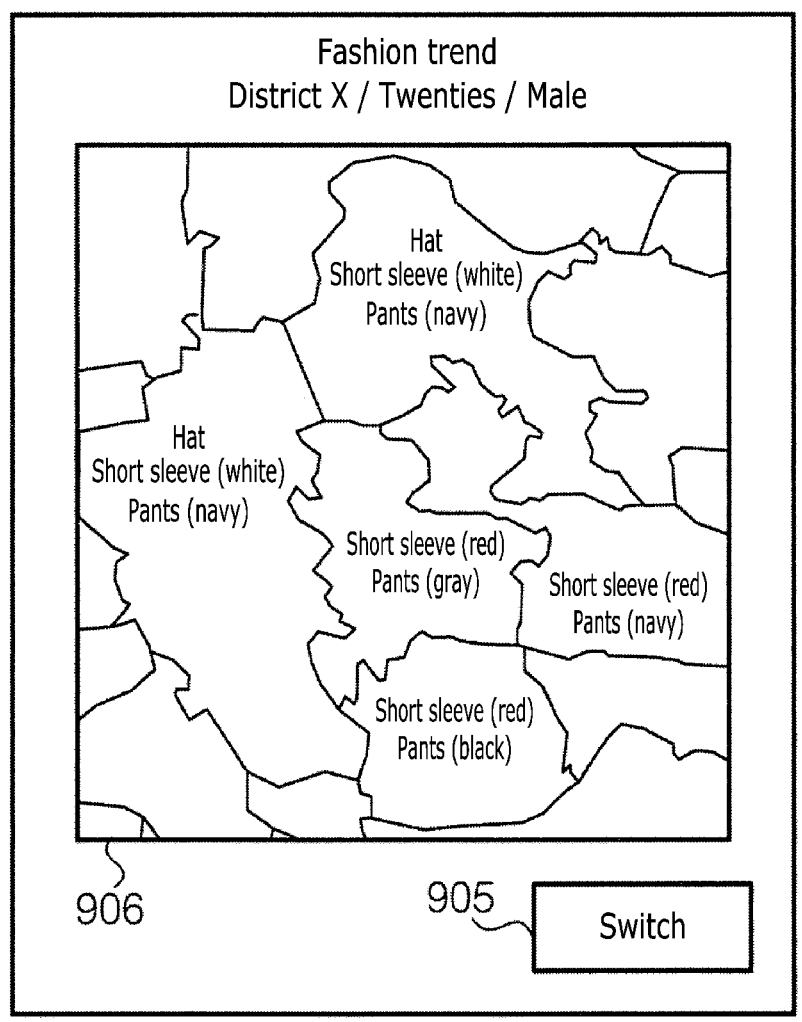
FIG. 13 is a diagram exemplifying a screen according to modified example 2 for displaying clothing information.

FIG. 13 is a diagram exemplifying a screen according to modified example 2 for displaying clothing information. In this example, information indicating clothing in each region is provided as clothing information. The representative clothing is determined by a statistical representative value (for example, a median value, an average value, or a modal value) of a plurality of subjects in each region. The representative clothing is determined by an analyzing unit 12 by using information recorded in a database 133. The representative clothing of each value is displayed with being superimposed on the map. According to this example, it is possible to know the tendency of clothing in each region. The displayed clothing information may be limited based on subject information. In the example of FIG. 13, only clothing information of men in their twenties is displayed.

3.3. Modified Example 3

Figure 14B:
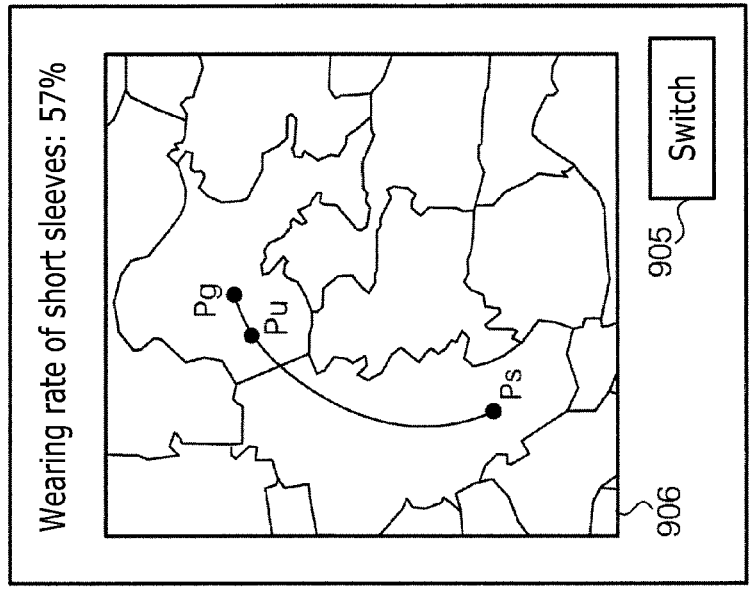
FIG. 14 is a diagram exemplifying a screen according to modified example 3 for displaying clothing information.
Figure 14A:
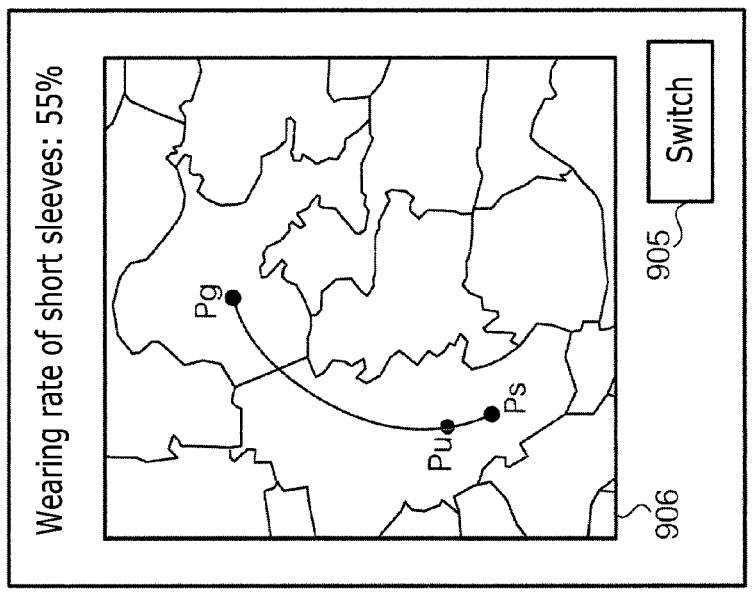

FIG. 14 is a diagram exemplifying a screen according to modified example 3 for displaying clothing information. A specific method of displaying clothing information with superimposing it on a map is not limited to that exemplified in modified example 1. In this example, a pointer Pu is displayed on the map. The pointer Pu moves on a route from a departure point Ps to a destination Pg in accordance with an operation of a user. This screen includes an area 907. The area 907 is an area for displaying clothing information (a wearing rate of short sleeves in this example) at a point indicated by the pointer Pu. In the example of FIG. 14A, the pointer Pu is located in a city A, and the clothing information of the city A is displayed in the area 907. When the pointer Pu moves to a city B, clothing information of city B is displayed in the area 907 (FIG. 14B).

In modified example 2, a captured image (for example, a real-time moving image) acquired from a camera 2 corresponding to the point indicated by the pointer Pu may be displayed in addition to the clothing information. The captured image may be displayed with being superimposed on the map, or may be displayed in an area different from the map. In this case, the camera 2 on which the captured image is displayed is switched in accordance with movement of the pointer Pu. For example, a requesting unit 22 transmits information for specifying a position indicated by the pointer Pu to a server 10. A selecting unit 14 of the server 10 switches the camera 2 to be selected according to this information.

3.4. Modified Example 4

Figure 15B:
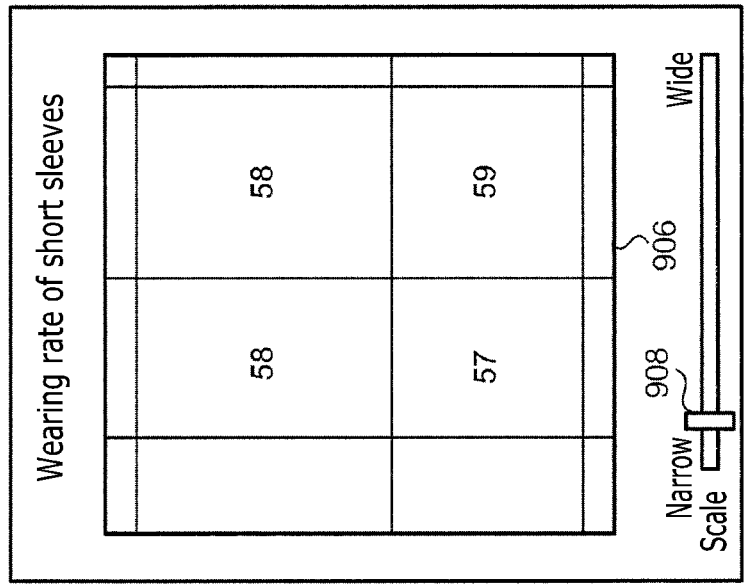
FIG. 15 is a diagram exemplifying a screen according to modified example 4 for displaying clothing information.
Figure 15A:
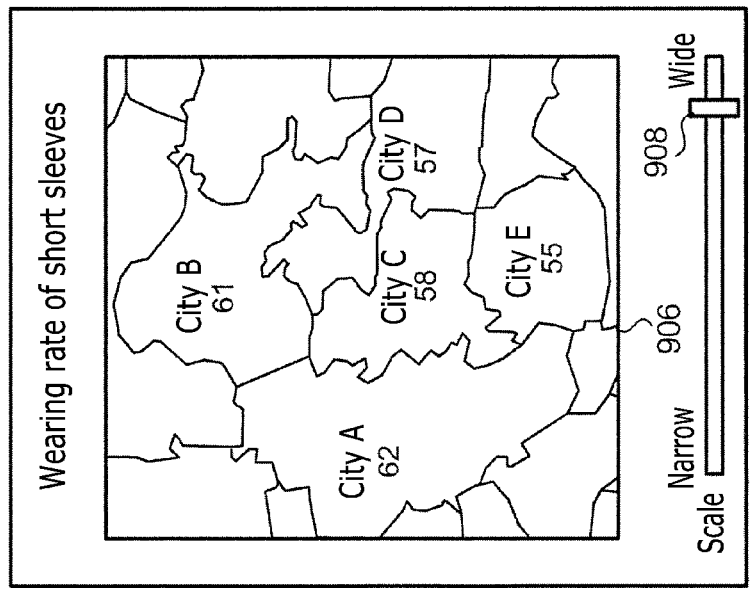

FIG. 15 is a diagram exemplifying a screen according to modified example 4 for displaying clothing information. In a case where post-processing information is displayed with being superimposed on a map, a unit of statistical processing for obtaining the post-processing information may be changed according to a scale of the map. This screen includes an area 906 and a slider 908. The slider 908 is a user interface (UI) element for changing the scale of the map displayed in the area 906. For example, the scale increases (a wide area is displayed) if the slider 908 is moved to the right, and the scale is decreased (a detailed map is displayed) if the slider 908 is moved to the left. When the scale of the map is changed, a requesting unit 22 transmits a request for browsing clothing information to a server 10. This request includes the changed scale of the map. In the server 10, a selecting unit 14 selects post-processing information corresponding to the designated scale, and a providing unit 15 transmits the newly selected post-processing information to a user terminal 20. For example, as shown in FIG. 15A, if the scale of the map is set to include a plurality of cities on one screen, a result of the statistical processing performed with the city as a unit is provided to the user terminal 20 as the clothing information. If this map is enlarged and changed to a scale in which a plurality of towns in a certain city is included in one screen, a result of the statistical processing performed with the town as a unit is provided to the user terminal 20 as the clothing information (FIG. 15B).

3.5. Modified Example 5

Figure 16A:
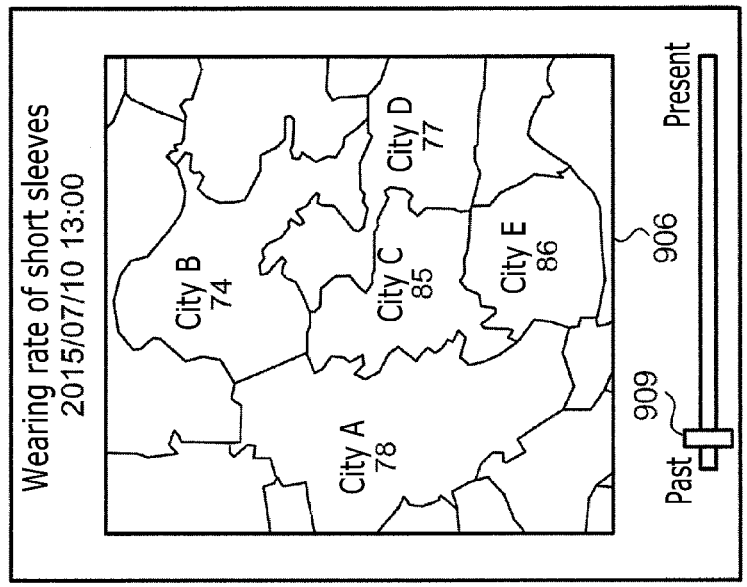
FIG. 16 is a diagram exemplifying a screen according to modified example 5 for displaying clothing information.
Figure 16B:
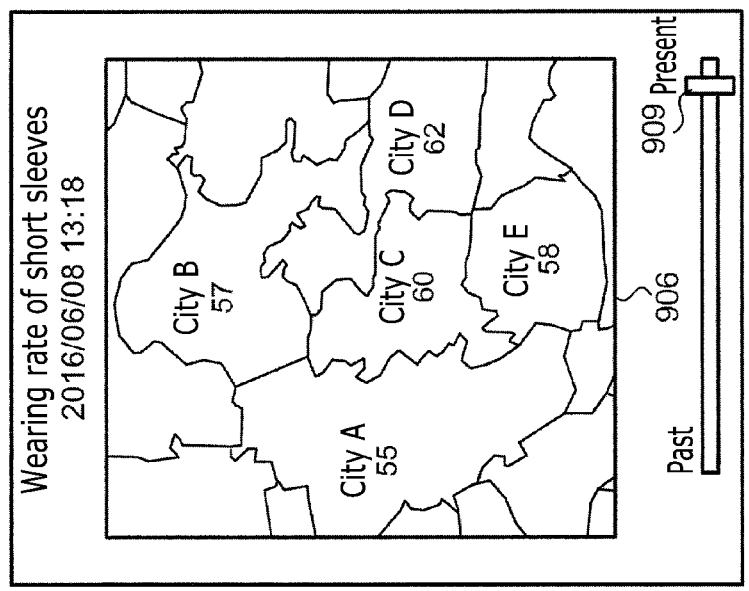

FIG. 16 is a diagram exemplifying a screen according to modified example 5 for displaying clothing information. The clothing information displayed on a user terminal 20 is not limited to the latest clothing information, and past information may be displayed. This screen includes an area 906 and a slider 909. The slider 909 is a UI element for specifying the date and time. When a position of the slider 909 is changed, a requesting unit 22 transmits a request for browsing the clothing information to a server 10. This request includes information for specifying the position of the slider or information for specifying the date and time in the past. In the server 10, a selecting unit 14 selects post-processing information of the specified date and time, and a providing unit 15 transmits the newly selected post-processing information to a user terminal 20. For example, if the slider 908 is moved to the right end, a current captured image is displayed in real time in the area 903 (FIG. 15A). If the slider 908 is moved from the right end to the left, a past captured image is displayed in the area 903 (FIG. 15B).

3.6. Modified Example 6

A selecting unit 14 may select clothing information according to other attribute information about a captured image, for example, a time stamp, subject information, or attribute information of a camera which has captured the image, instead of or in addition to position information. For example, an accepting unit 21 accepts, as key information, an input of information for limiting gender of a subject in addition to geographical information. A statistical processing unit 122 performs statistical processing on original information limited by the key information. For example, when the key information designates a city A as the geographical information and male as the gender of the subject, the statistical processing unit 122 performs the statistical processing on information including "male" in the subject information among original information extracted from images captured by cameras 2 installed in the city A. This statistical processing may be performed in advance and be recorded in the database 133. A providing unit 15 provides the post-processing information to the user terminal 20. According to this example, it is possible to obtain the clothing information which is limited by the "wearing rate of short sleeves of men in city A". Alternatively, the clothing information such as a "wearing rate of coats at night in city A" is obtained if the time stamp is used, and the clothing information such as a "wearing rate of long sleeves in indoor facility in city A" is obtained if an attribute of the camera is used. Further, it is also possible to obtain more limited clothing information such as a "wearing rate of short sleeves of men outdoors in city A" by combining these pieces of information.

3.7. Modified Example 7

An event that triggers transmission of clothing information from a server 10 to a user terminal 20 is not limited to the event exemplified in an embodiment. For example, the server 10 may push and transmit to the user terminal clothing information about a determined geographical position at a predetermined timing, specifically, at a determined time every day. The user of the user terminal 20 may register the geographical information and the time of the push transmission in the server 10 in advance. When the determined time comes, a providing unit 15 transmits the clothing information about the predetermined geographical position to the user terminal 20. According to this example, it is possible to automatically obtain, for example, information about what kind of clothing people in the vicinity of a workplace wear before the user leaves home every morning.

3.8. Modified Example 8

Figure 17:
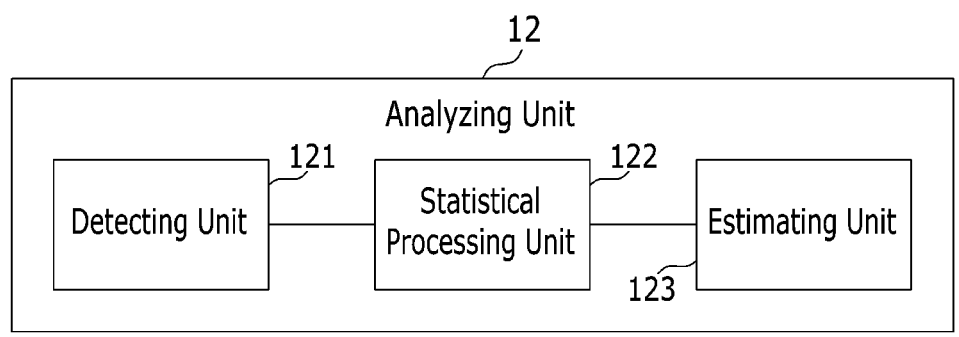
FIG. 17 is a diagram exemplifying a configuration of an analyzing unit 12 according to modified example 7.

FIG. 17 is a diagram exemplifying a configuration of an analyzing unit 12 according to modified example 8. In this example, the analyzing unit 12 further includes an estimating unit 123. The estimating unit 123 estimates an environment in which the captured image has been captured, for example, a weather, from at least one of original information detected by a detecting unit 121 and post-processing information obtained by a statistical processing unit 122. Here, the weather is a (subjective) weather due to sensation of a subject, specifically, for example, a sensible temperature. The estimating unit 123 has a conversion formula (for example, a formula for obtaining the sensible temperature with a wearing rate of short sleeves, a wearing rate of long sleeves, and a wearing rate of coats as input variables) for converting the post-processing information into the sensible temperature, and estimates the sensible temperature using the conversion formula. The estimating unit 123 outputs information indicating the obtained sensible temperature as environmental information. The environmental information is information indicating the environment in which the captured image has been captured.

FIG. 18 is a drawing exemplifying a screen for displaying clothing information and environmental information. In this example, the environmental information (the sensible temperature) is displayed on a map in addition to the captured image and clothing information (a wearing rate of short sleeves). According to this example, it is possible to obtain information which cannot be recognized by only general weather forecast, such as the sensible temperature at a specific floor of a specific building.

3.9. Modified Example 9

Figure 19:
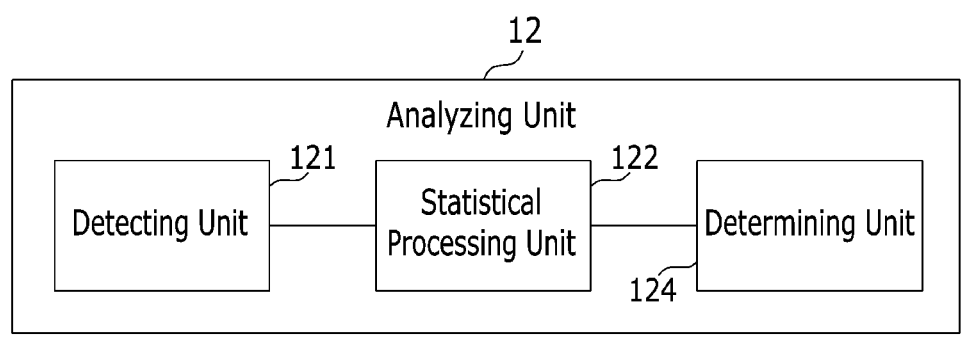
FIG. 19 is a diagram exemplifying a configuration of an analysis unit 12 according to modified example 9.

FIG. 19 is a diagram exemplifying a configuration of an analyzing unit 12 according to modified example 9. In this example, the analyzing unit 12 further includes a determining unit 124. The determining unit 124 determines clothing corresponding to a statistical representative value (for example, a median value, an average value, or a modal value) of a plurality of subjects from information recorded in at least one of a database 132 and a database 133. For example, in a case where the most subjects wear short sleeves as a shape of upper body clothing and wear red clothing as its color, the determining unit 124 determines that red and short-sleeved clothing is the representative clothing as the clothing worn in the upper body. Further, the determining unit 124 may limit a target of statistical processing by at least one of geographical information and subject information. Key information for limiting the geographical information and the subject information is inputted, for example, in a user terminal 20. According to this example, it is possible to know the average clothing (the sensible dress code) in a specific place.

3.10. Modified Example 10

Figure 20:
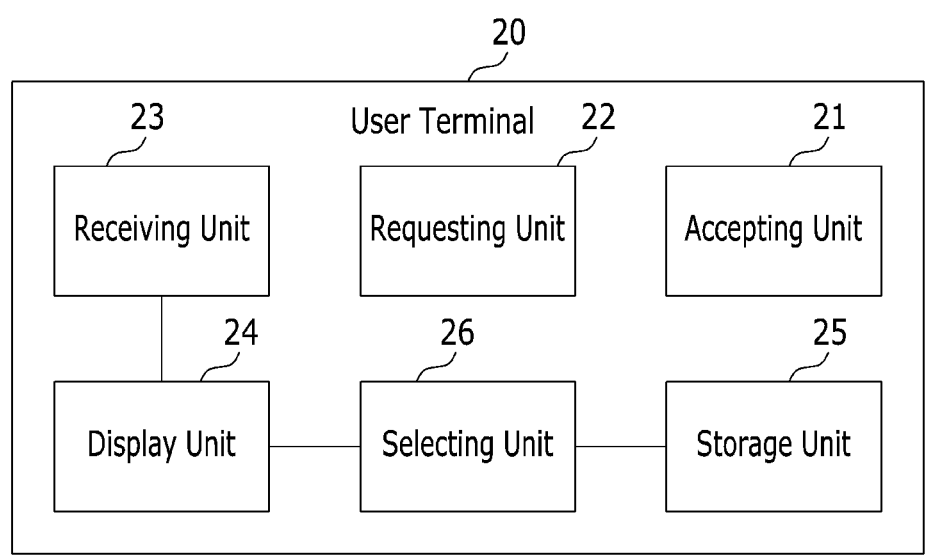
FIG. 20 is a diagram exemplifying a functional configuration of a user terminal 20 according to modified example 10.

FIG. 20 is a diagram exemplifying a functional configuration of a user terminal 20 according to modified example 10. In this example, the user terminal 20 further includes a storage unit 25 and a selecting unit 26. An auxiliary storage device 104 is an example of the storage unit 25, and a CPU 201 executing a client program is an example of the selecting unit 26. The storage unit 25 stores information about a plurality of pieces of clothing which a user actually or virtually possesses. The selecting unit 26 selects one piece of clothing according to clothing information provided by a providing unit 15 from among the information stored in the storage unit 25. The selecting unit 26 selects, for example, clothing closest to clothing corresponding to a statistical representative value of a plurality of subjects. Alternatively, the selecting unit 26 may select clothing which does not match any clothing of the plurality of subjects. A display unit 24 displays information for specifying one piece of clothing selected by the selecting unit 26. According to this example, it is possible to select and recommend clothing conforming to the condition from among the clothing possessed by the user. Specifically, it is possible to recommend the clothing which is close to the average clothing at a specific place or recommend the clothing which is different from the clothing of other people at the specific place, from among the clothing possessed by the user.

3.11. Other Modified Examples

A camera 2 is not limited to the camera exemplified in an embodiment. The camera 2 may be not fixed to a specific geographical position, but may be a device carried by a user, for example, a smartphone or a digital camera. In this case, for example, the user directly uploads an image captured by the smartphone to a server 10. Alternatively, the user uploads the image captured by the smartphone to a server (not shown) which provides an SNS (Social Networking Service). The server 10 of the clothing information providing system 1 crawls the Internet and collects images from the SNS. An image captured by the camera 2 is not limited to a moving image, and may be a still image.

Clothing information which a providing unit 15 provides to the user terminal 20 is not limited to post-processing information. Original information may be provided to the user terminal 20 as it is. The user terminal 20 displays the original information provided from the server 10, for example, as it is. Alternatively, the user terminal 20 performs statistical processing on the original information provided from the server 10 and displays the result.

In a database 132 and a database 133, past information may be deleted. For example, if a predetermined period has elapsed since information is registered in the database, the information may be deleted.

In the user terminal 20, a display unit 24 may display information different from the clothing information, together with the clothing information. This information may be information related to the user terminal 20, specifically, weather information obtained according to a current position of the user terminal 20. The weather information is obtained from, for example, a server which is different from the server 10 and provides weather information. The display unit 24 displays the obtained weather information and the clothing information on one screen.

The clothing information which is exemplified as displayed on a map in an embodiment may not be displayed on the map. For example, a wearing rate of short sleeves in each region shown in FIG. 12 may be displayed in the form of a text-based list.

An UI element for inputting key information is not limited to a text box exemplified in an embodiment. Any UI element such as a pull-down menu, a map, a calendar or the like may be used.

A part of a functional configuration exemplified in FIG. 2 may be omitted. For example, a storage unit 13 may be provided by an external server different from the clothing information providing system 1. Further, assignment of functions in a server 10 and a user terminal 20 is not limited to assignment exemplified in FIG. 2. A part of the functions which are implemented in the server 10 in an embodiment may be implemented in the user terminal 20. For example, the server 10 accumulates original information obtained from the collected captured images and transmits a part of the accumulated original information to the user terminal 20. The user terminal 20 performs statistical processing on the original information provided from the server 10 and displays the result. Furthermore, a server group which is physically consists of a plurality of devices may function as the server 10 in the clothing information providing system 1.

Hardware configurations of the server 10 and the user terminal 20 are not limited to those exemplified in an embodiment. The server 10 and the user terminal 20 may have any hardware configurations as long as they have the required functions.

The program executed by the CPU 101 and the CPU 201 and the like may be provided by a storage medium such as an optical disk, a magnetic disk, a semiconductor memory, or the like, or may be downloaded via a communication line such as the Internet. Further, these programs may not be those which cause all the steps described in the embodiment to be executed. The set of the server program and the client program is an example of a program group for causing the server apparatus and the client terminal to function as a clothing information providing system.

What is claimed is:

1. A clothing information providing system comprising:
a first processor that:
acquires an image captured by an image capturing device via a network; and
analyzes the image acquired by the image acquiring unit and detects clothing of a subject appearing in the image; and
a display device that displays clothing information about the clothing detected by the first processor on a user terminal,
wherein the first processor detects, for each of a plurality of subjects which are included in one or more images as a whole, at least one of a shape and color of clothing worn by a corresponding subject as the clothing,
wherein the first processor:
performs statistical processing on the at least one of the shape and color of clothing detected by the first processor; and
estimates an environment in which the image has been captured, from a result of the statistical processing obtained by the first processor,
wherein the display device displays the result of the statistical processing obtained by the first processor as the clothing information, and
wherein the display device further displays environmental information indicating the environment estimated by the first processor,
wherein the clothing information providing system further comprises a first storage device that stores a database in which a plurality of pieces of clothing information about the clothing detected by the first processor is recorded,
wherein the first processor selects a part of clothing information from among the plurality of pieces of clothing information stored in the database, and
wherein the display device displays the part of clothing information selected by the first processor.

2. The clothing information providing system according to claim 1, further comprising a second processor that accepts a designation of a geographical position by a user of the user terminal,
wherein the display device displays the clothing information corresponding to the position accepted by the second processor.

3. The clothing information providing system according to claim 2, wherein the second processor accepts a designation of a route including a departure place and a destination, and
wherein the display device displays the clothing information corresponding to the route accepted by the second processor.

4. The clothing information providing system according to claim 1, wherein in the database, position information indicating a geographical position is recorded for each of the plurality of pieces of clothing information, and
wherein the first processor the part of clothing information from among the plurality of pieces of clothing information based on the position information.

5. The clothing information providing system according to claim 1, wherein in the database, attribute information indicating an attribute of a captured image in which clothing related to the clothing information is detected is recorded for each of the plurality of pieces of clothing information, and wherein the first processor selects the part of clothing information from among the plurality of pieces of clothing information based on the attribute information.

6. The clothing information providing system according to claim 1, further comprising a second processor that accepts a request for providing clothing information in the user terminal, wherein the first processor selects the part of clothing information according to the request accepted by the second processor.

7. The clothing information providing system according to claim 1, wherein the first processor calculates a ratio of subjects wearing clothing of a specific shape among the plurality of subjects.

8. The clothing information providing system according to claim 1, wherein the display device displays an image obtained by synthesizing the result of the statistical processing on the image.

9. The clothing information providing system according to claim 1, wherein the first processor acquires position information indicating a geographical position corresponding to the image, wherein the first processor performs the statistical processing with a geographical region as a unit, and wherein the display device displays the clothing information for each geographical region.

10. The clothing information providing system according to claim 1, further comprising:

a second storage device that stores information about a plurality of pieces of clothing possessed by a user of the user terminal; and a second processor that selects one piece of clothing from among the plurality of pieces of clothing according to the clothing information, wherein the display device displays information for specifying the one piece of clothing selected by the second processor.

11. The clothing information providing system according to claim 1, wherein the shape indicates one of a plurality of types of clothing.

12. The clothing information providing system according to claim 11, wherein the plurality of types of clothing include a short-sleeved shirt, a long-sleeved shirt, and a coat.

13. A clothing information providing method comprising:

acquiring an image captured by an image capturing device via a network;

analyzing the acquired image and detecting, for each of a plurality of subjects which are included in one or more images as a whole, at least one of a shape and color of clothing worn by a corresponding subject as clothing of a subject appearing in the image;

performing statistical processing on the at least one of the shape and color of the detected clothing;

estimating an environment in which the image has been captured, from a result of the statistical processing;

displaying the result of the statistical processing as clothing information about the detected clothing on a user terminal; and displaying environmental information indicating the estimated environment on the user terminal, wherein the clothing information providing method further comprises:

storing a database in which a plurality of pieces of clothing information about the detected clothing is recorded, selecting a part of clothing information from among the plurality of pieces of clothing information stored in the database; and displaying the selected part of clothing information.

14. The clothing information providing method according to claim 13, wherein the shape indicates one of a plurality of types of clothing.

15. The clothing information providing method according to claim 14, wherein the plurality of types of clothing include a short-sleeved shirt, a long-sleeved shirt, and a coat.

16. A non-transitory recording medium storing a program for causing one or more computers to execute:

acquiring an image captured by an image capturing device via a network;

analyzing the acquired image and detecting, for each of a plurality of subjects which are included in one or more images as a whole, at least one of a shape and color of clothing worn by a corresponding subject as clothing of a subject appearing in the image;

performing statistical processing on the at least one of the shape and color of the detected clothing;

estimating an environment in which the image has been captured, from a result of the statistical processing;

displaying the result of the statistical processing as clothing information about the detected clothing on a user terminal; and displaying environmental information indicating the estimated environment on the user terminal, wherein the program causes the one or more computers to further execute:

storing a database in which a plurality of pieces of clothing information about the detected clothing is recorded, selecting a part of clothing information from among the plurality of pieces of clothing information stored in the database; and displaying the selected part of clothing information.

17. The non-transitory recording medium according to claim 16, wherein the shape indicates one of a plurality of types of clothing.

18. The non-transitory recording medium according to claim 17, wherein the plurality of types of clothing include a short-sleeved shirt, a long-sleeved shirt, and a coat.

\* \* \* \* \*